(12) United States Patent (10) Patent No.: US 12,513,557 B2
Gad et al. (45) Date of Patent: Dec. 30, 2025

(54) DUCTING MITIGATION IN OPEN RADIO ACCESS NETWORK

(71) Applicant: Dell Products L.P., Round Rock, TX (US)

(72) Inventors: Omar Gad, London (GB); Marwan Mansour, Alexandria (EG); Medhat Mohamed Khalifa, Giza (EG); Mohamed Abouzeid, Sheikh Zayed (EG)

(73) Assignee: DELL PRODUCTS L.P., Round Rock, TX (US)

( * ) Notice: Subject to any disclaimer, the term of this patent is extended or adjusted under 35 U.S.C. 154(b) by 315 days.

(21) Appl. No.: 18/363,132

(22) Filed: Aug. 1, 2023

(65) Prior Publication Data

US 2025/0048169 A1    Feb. 6, 2025

(51) Int. Cl.
*H04W 28/02* (2009.01)
*H04L 5/00* (2006.01)

(52) U.S. Cl.
CPC ....... *H04W 28/0236* (2013.01); *H04L 5/0073* (2013.01)

(58) Field of Classification Search
CPC . H04W 28/0236; H04W 88/18; H04W 24/02; H04L 5/0073
See application file for complete search history.

(56) References Cited

U.S. PATENT DOCUMENTS

| | | | |
|---|---|---|---|
| 6,304,760 | B1 | 10/2001 | Thomson et al. |
| 2012/0140690 | A1* | 6/2012 | Choi ............... H04J 11/0023 370/312 |
| 2015/0043419 | A1* | 2/2015 | Boudreau ............ H04B 7/024 370/315 |
| 2018/0124813 | A1* | 5/2018 | Li ...................... H04W 72/121 |
| 2020/0336228 | A1 | 10/2020 | Ryan et al. |
| 2020/0344619 | A1* | 10/2020 | Gormley ............... H04L 5/0073 |

FOREIGN PATENT DOCUMENTS

CN    113141623 A    7/2021

OTHER PUBLICATIONS

International Search Report and Written Opinion received for PCT Application Serial No. PCT/US2023/036309 dated Apr. 29, 2024, 16 pages.

* cited by examiner

*Primary Examiner* — Mohammad S Anwar
(74) *Attorney, Agent, or Firm* — Amin, Turocy & Watson, LLP

(57) ABSTRACT

Ducting mitigation in an open radio access network (e.g., using a computerized tool), is enabled. For example, a system can comprise a processor and a memory that stores executable instructions that, when executed by the processor, facilitate performance of operations, comprising, based on cell configuration data representative of a cell configuration applicable to a cellular node and based on meteorological data representative of a meteorological measurement applicable to the cellular node, determining, using a ducting prediction model, whether the cellular node is threshold likely to experience ducting, and in response to determining that the cellular node is threshold likely to experience the ducting, determining, using a ducting mitigation model, a ducting mitigation action to be performed that has been determined to mitigate the ducting.

20 Claims, 11 Drawing Sheets

```
                                          ┌─ 700
                                          ▼

┌─────────────────────────────────────────────────────────────┐
        │ BASED ON CELL CONFIGURATION DATA REPRESENTATIVE OF A CELL   │
702 ────│ CONFIGURATION APPLICABLE TO A CELLULAR NODE AND BASED ON    │
        │ METEOROLOGICAL DATA REPRESENTATIVE OF A METEOROLOGICAL      │
        │ MEASUREMENT APPLICABLE TO THE CELLULAR NODE, DETERMINING,   │
        │ USING A DUCTING PREDICTION MODEL, WHETHER THE CELLULAR NODE │
        │         IS THRESHOLD LIKELY TO EXPERIENCE DUCTING           │
        └─────────────────────────────────────────────────────────────┘
                                    │
                                    ▼
        ┌─────────────────────────────────────────────────────────────┐
        │    IN RESPONSE TO DETERMINING THAT THE CELLULAR NODE IS     │
704 ────│   THRESHOLD LIKELY TO EXPERIENCE THE DUCTING, DETERMINING,  │
        │ USING A DUCTING MITIGATION MODEL, A DUCTING MITIGATION ACTION│
        │    TO BE PERFORMED THAT HAS BEEN DETERMINED TO MITIGATE THE │
        │                          DUCTING                            │
        └─────────────────────────────────────────────────────────────┘
```

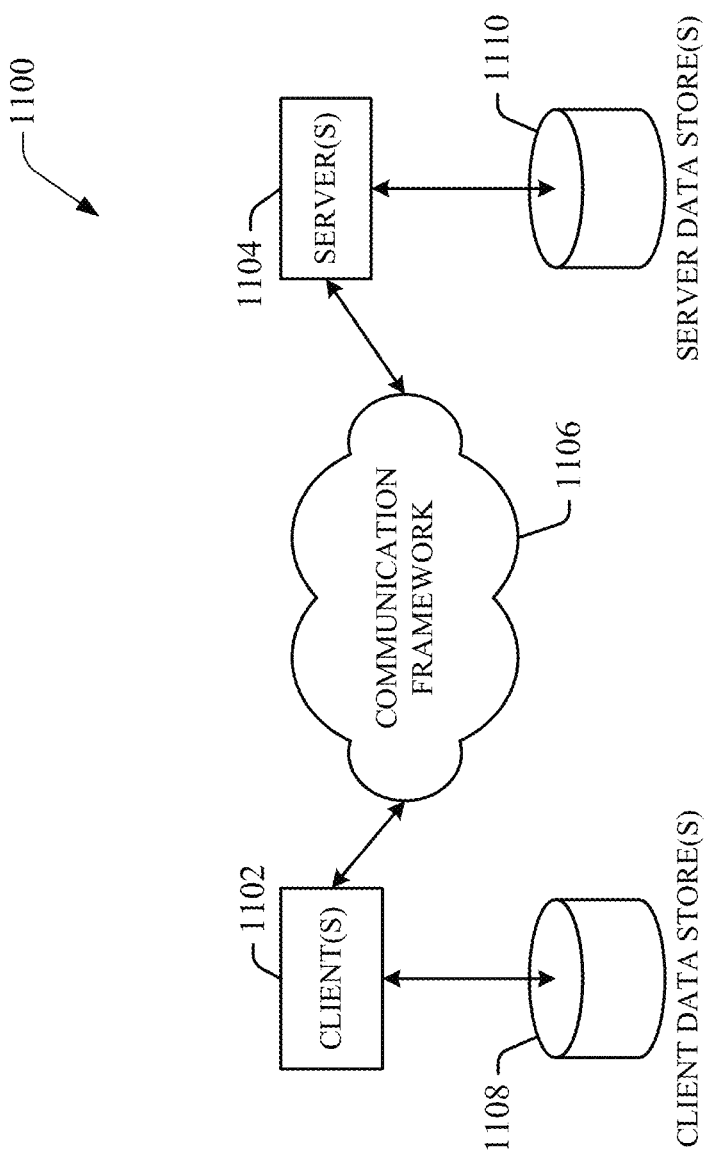

DUCTING MITIGATION IN OPEN RADIO ACCESS NETWORK

BACKGROUND

Ducting is a complex and dynamic phenomenon that depends on various environmental factors, such as temperature, humidity, pressure, or cell configuration. Ducting is a type of atmospheric propagation that can occur when a stable layer of warm air is trapped between two layers of cooler air. In this situation, radio waves can become trapped and travel longer distances than usual, causing interference and signal degradation, in addition to multipath propagation in which the signal takes multiple paths to reach the receiver, causing more interference and fading. Ducting is commonly observed in coastal regions, and can occur at any time of year, but is most prevalent in spring and summer. Ducting can cause high interference (e.g., especially when time division duplex (TDD) and physical cell ID (PCI) collide), handover issues, user equipment (UE) quality of service (QoS) and throughput degradation, increased block error rate (BLER) and drops on victim cell, among other problems.

The above-described background relating to telecommunications systems is merely intended to provide a contextual overview of some current issues and is not intended to be exhaustive. Other contextual information may become further apparent upon review of the following detailed description.

BRIEF DESCRIPTION OF DRAWINGS

FIG. 11 is an example, non-limiting networking environment in which one or more embodiments described herein can be implemented.

DETAILED DESCRIPTION

Figure 1:
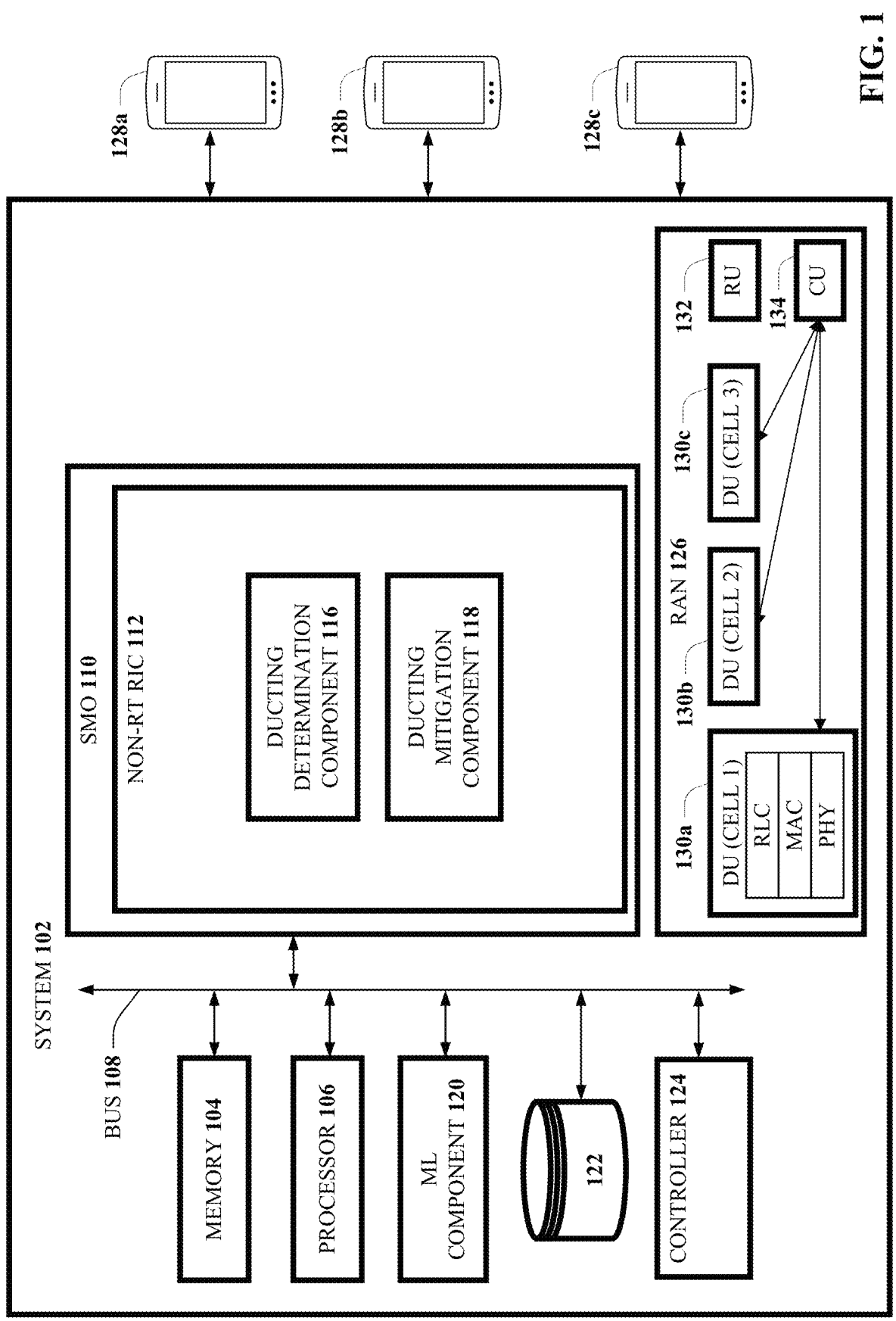
FIG. 1 is a block diagram of an exemplary system in accordance with one or more embodiments described herein.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, ducting mitigation can be improved in various ways, and various embodiments are described herein to this end and/or other ends. The disclosed subject matter relates to telecommunications systems and, more particularly, to ducting mitigation in an open radio access network.

According to an embodiment, a system can comprise a processor, and a memory that stores executable instructions that, when executed by the processor, facilitate performance of operations, comprising, based on cell configuration data representative of a cell configuration applicable to a cellular node and based on meteorological data representative of a meteorological measurement applicable to the cellular node, determining, using a ducting prediction model, whether the cellular node is threshold likely to experience ducting, and in response to determining that the cellular node is threshold likely to experience the ducting, determining, using a ducting mitigation model, a ducting mitigation action to be performed that has been determined to mitigate the ducting.

In one or more embodiments, the ducting prediction model can be generated using machine learning based on past ducting, other than the ducting. In additional embodiments, the ducting mitigation model can be generated using machine learning based on past ducting mitigation actions, other than the ducting mitigation action.

In one or more embodiments, the ducting mitigation action can comprise a change in transmission power applicable to the cellular node. In further embodiments, the ducting mitigation action can comprise a change in a tilt of an antenna applicable to the cellular node.

In one or more embodiments, the cell configuration data can comprise at least one of time advance data representative of a time advance applicable to the cellular node, geographical location data representative of a geographical location of the cellular node, azimuth data representative of an azimuth associated with the cellular node, antenna height data representative of a height of an antenna of the cellular node, transmission power data representative of a power with which the cellular node transmits, operating frequency data representative of an operating frequency associated with the cellular node, duplexing technique data representative of a duplexing technique usable by the cellular node, antenna tilt data representative of a tilt of the antenna of the cellular node, or antenna gain data representative of a gain of the antenna of the cellular node.

In one or more embodiments, the meteorological data can comprise at least one of humidity data representative of a humidity measurement applicable to the cellular node, wind speed data representative of a wind speed measurement applicable to the cellular node, wind direction data representative of a wind direction measurement applicable to the cellular node, temperature data representative of a temperature measurement applicable to the cellular node, atmospheric pressure data representative of an atmospheric pressure measurement applicable to the cellular node, or terrain type data representative of a terrain type applicable to the cellular node.

In one or more embodiments, the above operations can further comprise initiating the ducting mitigation action that has been determined to mitigate the ducting. In this regard, the above operations can further comprise, in response to initiating the ducting mitigation action, determining, using the ducting prediction model, whether the ducting applicable to the cellular node has stopped occurring. Further in this regard, the above operations can further comprise, in response to a result of the determining whether the ducting has stopped occurring indicating that the ducting has not stopped occurring, determining, using the ducting mitigation model, a revised ducting mitigation action different from the ducting mitigation action. Further in this regard, the above operations can further comprise initiating the revised ducting mitigation action.

In another embodiment, a non-transitory machine-readable medium can comprise executable instructions that, when executed by a processor, facilitate performance of operations, comprising, based on cell configuration data applicable to a cellular node and based on meteorological data applicable to the cellular node, determining, using a ducting prediction model, a likelihood that the cellular node is going to experience ducting, and in response to determining, based on the likelihood, that the cellular node is going to experience the ducting, determining, using a ducting mitigation model, a ducting mitigation action to be performed that has been determined to mitigate the ducting.

In one or more embodiments, the ducting prediction model can be generated using machine learning based on past ducting, other than the ducting. In one or more embodiments, the ducting mitigation model can be generated using machine learning based on past ducting mitigation actions, other than the ducting mitigation action.

In one or more embodiments, the ducting mitigation action can comprise a change in transmission power applicable to the cellular node. In further embodiments, the ducting mitigation action can comprise a change in a tilt of an antenna applicable to the cellular node.

According to yet another embodiment, a method can comprise, based on cell configuration data applicable to a cellular node and based on meteorological data applicable to the cellular node, determining, by network equipment comprising a processor and using a ducting prediction model, whether the cellular node will experience ducting, and in response to determining that the cellular node will experience the ducting, determining, by the network equipment and using a ducting mitigation model, a ducting mitigation action to be performed that has been determined to mitigate the ducting.

In one or more embodiments, the cell configuration data can comprise at least one of time advance data, geographical location data, azimuth data, antenna height data, transmission power data, operating frequency data, duplexing technique data, antenna tilt data, or antenna gain data applicable to the cellular node.

In one or more embodiments, the meteorological data can comprise at least one of humidity data, wind speed data, wind direction data, temperature data, atmospheric pressure data, or terrain type data applicable to the cellular node.

In one or more embodiments, the above method can further comprise facilitating, by the network equipment, the ducting mitigation action that has been determined to mitigate the ducting.

It should be appreciated that additional manifestations, configurations, implementations, protocols, etc. can be utilized in connection with the following components described herein or different/additional components as would be appreciated by one skilled in the art.

Embodiments herein enable determination (e.g., via a machine learning (ML) model) of the optimal antenna tilt and/or transmission power to be utilized at a cellular node (e.g., a source cell), for instance, to prevent ducting from occurring (e.g., in the next day), or to reduce its impact.

Turning now to FIG. 1, there is illustrated an example, non-limiting system 102 in accordance with one or more embodiments herein. System 102 can comprise a computerized tool, which can be configured to perform various operations relating to ducting mitigation in an open radio access network (ORAN). The system 102 can comprise one or more of a variety of components, such as memory 104, processor 106, bus 108, SMO 110, non-real time (RT) radio access network (RAN) intelligent controller (RIC) 112, ducting determination component 116, ducting mitigation component 118, ML component 120, model(s) 122, controller 124 (e.g., a near-RT RIC), radio access network (RAN) 126 (e.g., an E2 node), distributed units (DUs) 130, radio unit (RU) 132, and central unit (CU) 134. In various embodiments, the system 102 can be communicatively coupled to, or can further comprise, one or more user equipment (UE) 128. In various embodiments, one or more of the memory 104, processor 106, bus 108, SMO 110, non-RT RIC 112, ducting determination component 116, ducting mitigation component 118, ML component 120, model(s) 122, controller 124, RAN 126 (e.g., an E2 node), one or more of UE 128, one or more of DU 130, RU 132, and/or CU 134 can be communicatively or operably coupled (e.g., over a bus or wireless network) to one another to perform one or more functions of the system 102.

In various embodiments, the SMO 110 can comprise a service management and orchestration layer that controls, for instance, configuration and automation aspects of RIC and/or RAN 126 elements. In this regard, the SMO 110 can onboard xApps and/or rApps onto RIC components. In various embodiments, the non-RT RIC 112 can comprise an intelligent controller that hosts ML models (e.g., model(s) 122), and has access to data coming from the RAN 126 to validate and/or train such model(s) 122. In various embodiments, the controller 124 can comprise a near-RT RIC.

In various embodiments, the ducting determination component 116 can, based on cell configuration data representative of a cell configuration applicable to a cellular node and based on meteorological data representative of a meteorological measurement applicable to the cellular node, determine, using a ducting prediction model (e.g., of the model(s) 112), whether the cellular node is threshold likely to experience ducting. In various embodiments, the ducting determination component 116 can comprise an rApp on the non-RT RIC 112. In various embodiments, the ducting determination component 116 can predict the occurrence of ducting in the next day (e.g., or another defined date or time). In some embodiments, the ducting determination component 116 can comprise a supervised classifier that can detect ducting without taking into consideration its neighboring cells. In various embodiments, the ducting determination component 116 can utilize, as an input, the next day's (or another suitable date/time) weather forecast for a location of a cellular node herein (e.g., cellular node 202), such as the temperature (e.g., min and max), humidity percentage, atmospheric pressure, and/or wind speed. The ducting determination component 116 can further utilize, as input the parameters and/or KPIs applicable to the cellular node 202, such as time advance and/or antenna tilt. The ducting determination component 116 (e.g., using the ducting prediction model) can output a Boolean result, in which 0 indicates a normal case with no ducting, and 1 indicates that ducting is expected to occur tomorrow (e.g., or another defined date or time). In various embodiments, the cell configuration data can comprise at least one of time advance data representative of a time advance applicable to the cellular node, geographical location data representative of a geographical location of the cellular node, azimuth data representative of an azimuth associated with the cellular node, antenna height data representative of a height of an antenna of the cellular node, transmission power data representative of a power with which the cellular node transmits, operating frequency data representative of an operating frequency associated with the cellular node, duplexing technique data representative of a duplexing technique usable by the cellular node, antenna tilt data representative of a tilt of the antenna of the cellular node, or antenna gain data representative of a gain of the antenna of the cellular node. In various embodiments, the meteorological data can comprise at least one of humidity data representative of a humidity measurement applicable to the cellular node, wind speed data representative of a wind speed measurement applicable to the cellular node, wind direction data representative of a wind direction measurement applicable to the cellular node, temperature data representative of a temperature measurement applicable to the cellular node, atmospheric pressure data representative of an atmospheric pressure measurement applicable to the cellular node, or terrain type data representative of a terrain type applicable to the cellular node. It is noted that the ducting prediction model can be generated using machine learning based on past ducting, other than the ducting.

In various embodiments, the ducting mitigation component 118 can, in response to a determination (e.g., via the ducting determination component 116) that the cellular node (e.g., cellular node 202) is threshold likely to experience the ducting, determine, using a ducting mitigation model (e.g., of the model(s) 112), a ducting mitigation action to be performed that has been determined to mitigate the ducting. In various embodiments, the ducting mitigation component 118 can comprise an rApp on the non-RT RIC 112. In various embodiments, the above ducting mitigation action can comprise a change in transmission power applicable to the cellular node. In further embodiments, the above ducting mitigation action can comprise a change in a tilt of an antenna applicable to the cellular node. In various embodiments, the ducting mitigation component 118 can utilize, as an input, the ducting prediction (e.g., via the ducting determination component 116) to avoid ducting, and can identify and/or change the parameters of the cellular node 202 to reach an optimal action that can be taken in order to avoid ducting, and avoid impacting other cells (e.g., neighbor cells or cellular nodes). In this regard, the ducting mitigation model herein can comprise a rule-based model which follows a specific set of rules to identify the optimal action. It is noted that the ducting mitigation model can be generated using machine learning based on past ducting mitigation actions, other than the ducting mitigation action. In various embodiments, the ducting mitigation component 118 can continue to facilitate countermeasures, for instance, without affecting the performance of the cellular node (e.g., decreasing the power or tilt below a respective defined thresholds values) until the ducting determination component 116 no longer predicts ducting based on tomorrow's (e.g., or another suitable date or time) weather forecast and the updated cell configurations (e.g., regarding the cellular node 202). In some embodiments, new cell configurations can be applied to the cellular node 202 on the next day. In a case in which the ducting determination component 116 predicts that no ducting will happen during the next day, then the ducting mitigation component 118 can set the tilt and/or transmit power parameters to their default values, (e.g., according to defined SMO 110 preset configurations).

In various embodiments, the ducting mitigation component 118 can initiate the ducting mitigation action that has been determined to mitigate the ducting. The ducting determination component 116 can then determine, using the ducting prediction model, whether the ducting applicable to the cellular node has stopped occurring. The ducting mitigation component 118 can then, in response to a result of the determining (e.g., via the ducting determination component 116) whether the ducting has stopped occurring indicating that the ducting has not stopped occurring, determine, using the ducting mitigation model, a revised ducting mitigation action different from the ducting mitigation action. In this regard, the ducting mitigation component 118 can initiate the revised ducting mitigation action.

Various embodiments herein can employ artificial-intelligence or machine learning systems and techniques to facilitate learning user behavior, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following.

It is noted that systems and/or associated controllers, servers, or machine learning components herein can comprise artificial intelligence component(s) which can employ an artificial intelligence (A.I.) model and/or M.L. or an M.L. model that can learn to perform the above or below described functions (e.g., via training using historical training data and/or feedback data).

In some embodiments, ML component 120 can comprise an A.I. and/or M.L. model that can be trained (e.g., via supervised and/or unsupervised techniques) to perform the above or below-described functions using historical training data comprising various context conditions that correspond to various augmented network optimization operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by the ML component 120. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, a ML component 120 herein can initiate an operation associated with determining various thresholds herein (e.g., a motion pattern thresholds, input pattern thresholds, similarity thresholds, authentication signal thresholds, audio frequency thresholds, or other suitable thresholds).

In an embodiment, the ML component 120 can perform a utility-based analysis that factors cost of initiating the above-described operations versus benefit. In this embodiment, the ML component 120 can use one or more additional context conditions to determine various thresholds herein.

To facilitate the above-described functions, a ML component 120 herein can perform classifications, correlations, inferences, and/or expressions associated with principles of artificial intelligence. For instance, the ML component 120 can employ an automatic classification system and/or an automatic classification. In one example, the ML component 120 can employ a probabilistic and/or statistical-based analysis (e.g., factoring into the analysis utilities and costs) to learn and/or generate inferences. The ML component 120 can employ any suitable machine-learning based techniques, statistical-based techniques and/or probabilistic-based techniques. For example, the ML component 120 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In another example, the ML component 120 can perform a set of machine-learning computations. For instance, the ML component 120 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations.

Figure 2:
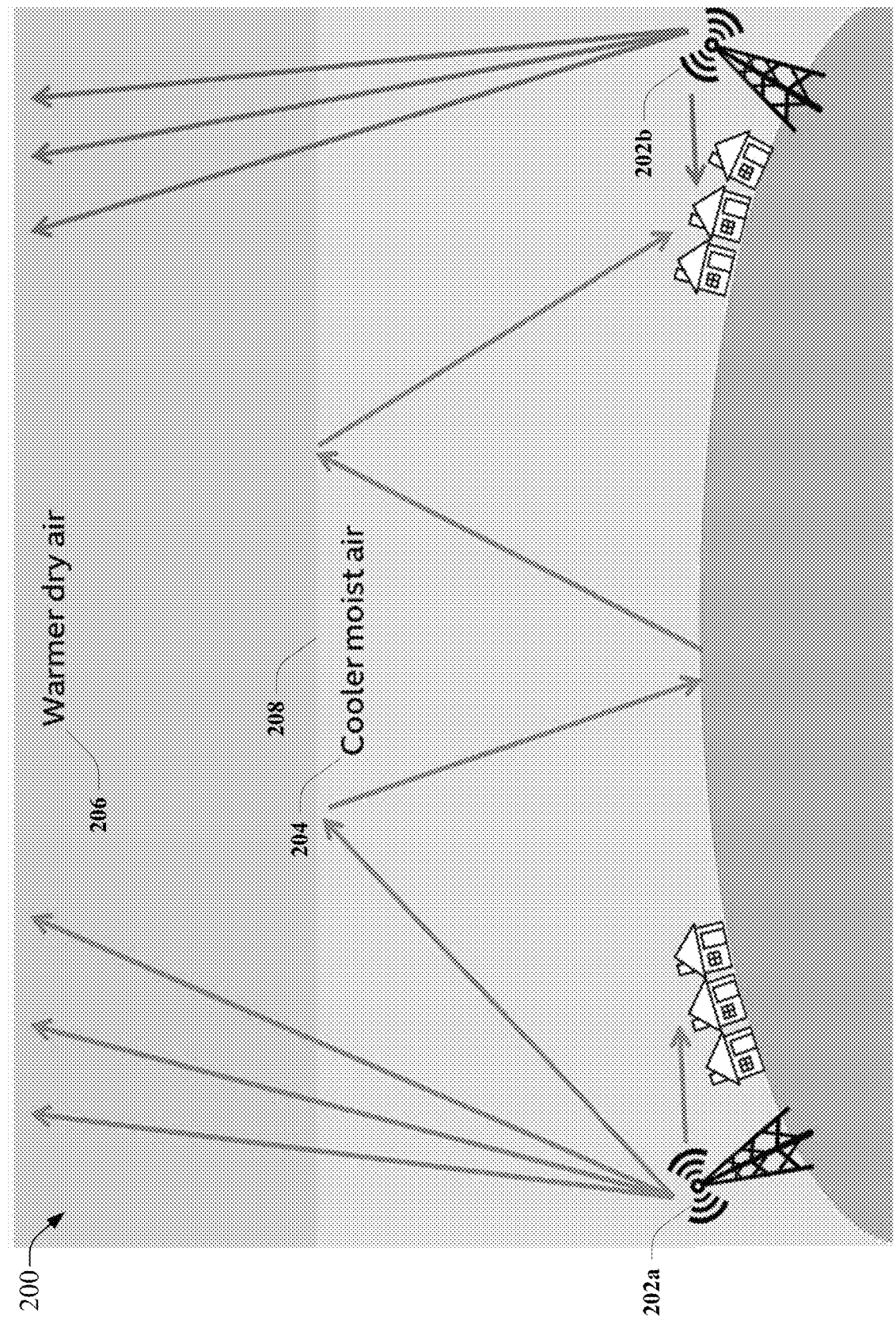
FIG. 2 is a diagram of exemplary ducting in accordance with one or more embodiments described herein.

Turning now to FIG. 2, there is illustrated a diagram 200 of exemplary ducting in accordance with one or more embodiments described herein. Diagram 200 can comprise a cellular node 202a and a cellular node 202b (e.g., cellular nodes 202). Cooler moist air 204 can be separated from warmer dry air 206 by a thin transition or boundary 208. The boundary 208 can cause a reflection of signals to/from a cellular node 202 herein, which can cause corresponding signal(s) to propagate for longer distances than intended.

Figure 3:
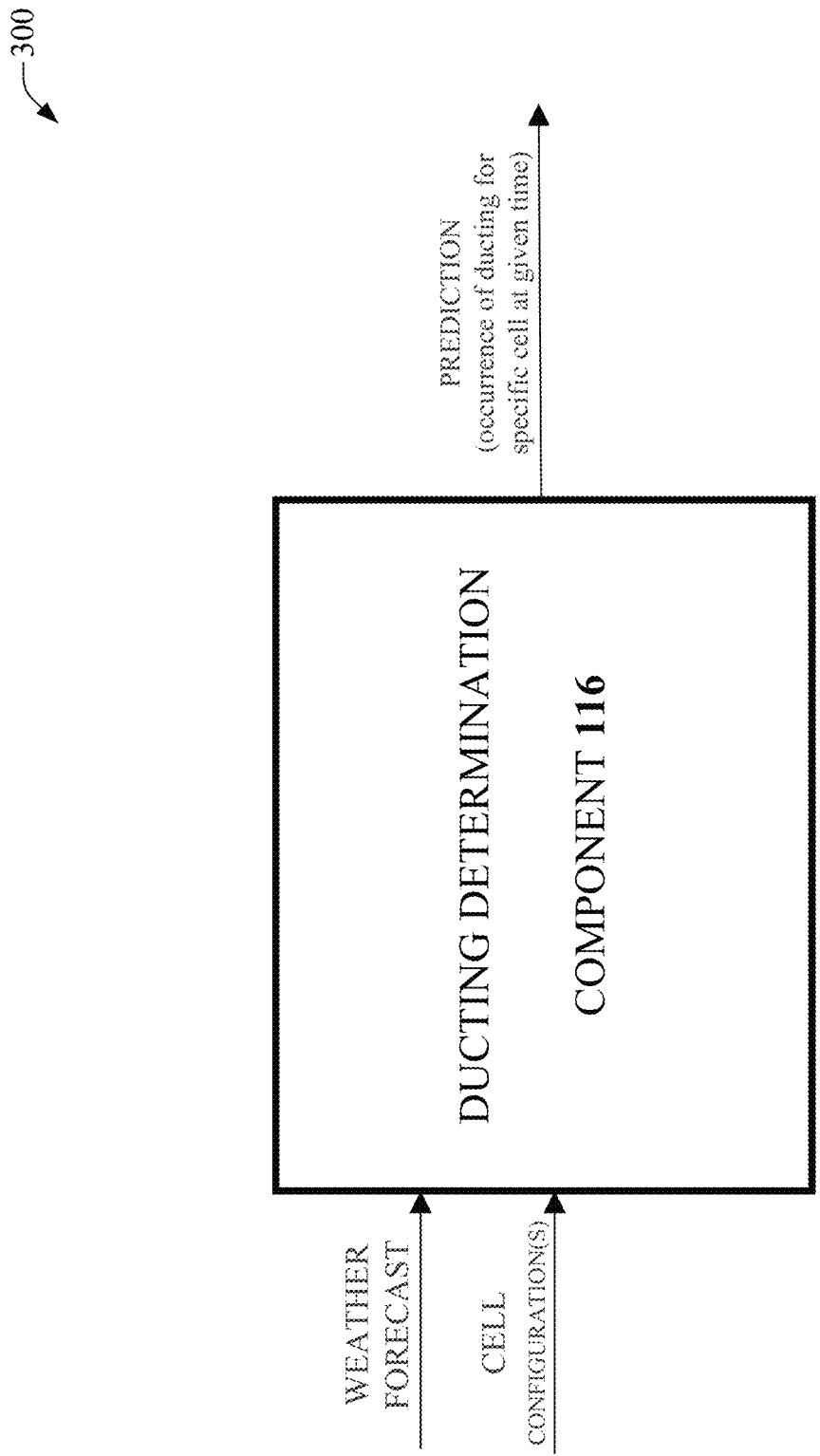
FIG. 3 is a diagram of exemplary ducting prediction in accordance with one or more embodiments described herein.
Figure 4:
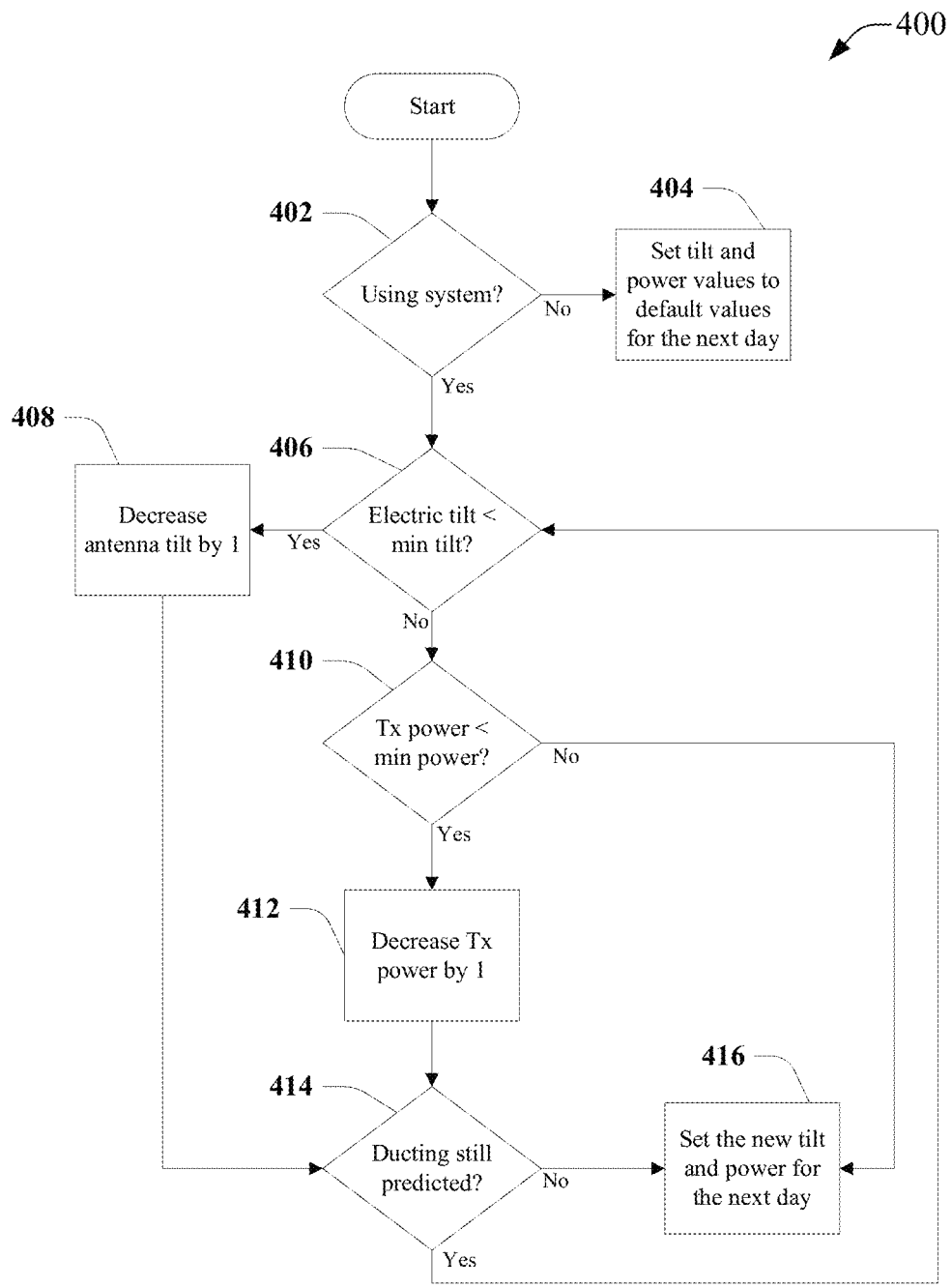
FIG. 4 is a flow chart for a process associated with ducting mitigation in accordance with one or more embodiments described herein.

FIG. 3 is a diagram of exemplary ducting prediction 300 in accordance with one or more embodiments described herein. In various embodiments, the ducting determination component 116 (e.g., an rApp) can be triggered daily (and/or according to other suitable defined intervals), from each cell (e.g., cellular node 202), to be able to determine ducting herein. For each cellular node 202, the ducting determination component 116 can retrieve the weather forecast for the cell's location from one or more weather forecasting application programming interfaces (APIs). The ducting determination component 116 can also retrieve the configurations applicable to the cellular node 202. The collected information can be passed, as input, to the ducting prediction model, which can be utilized by the ducting mitigation component 118 and the ducting prediction model to output a Boolean value, in which 0 indicates a normal case with no ducting, and 1 indicates that ducting is expected to occur tomorrow (or during another defined period of time). Input to the ducting prediction model can comprise one or more of the following:

Cell Configurations:
  time advance
  geographical location (to be able to identify tomorrow's weather based on the geographical location of the cell and weather forecasting APIs)
  azimuth
  antenna height
  transmission power
  operating frequency
  duplexing technique (TDD or frequency division duplexing (FDD))
  antenna tilt
  antenna Gain The next day's weather forecast:
  humidity
  wind speed
  wind direction
  temperature
  atmospheric pressure
  terrain type FIG. 4 is a flow chart for a process 400 associated with ducting mitigation in accordance with one or more embodiments described herein. At 402, if the system 102 is activated (e.g., YES at 402), the process 400 can proceed to 406. If at 402, the system 102 is not activated (e.g., NO at 402), the process 400 can proceed to 404. At 404, default values for power and tilt can be utilized for the next day (e.g., or for a different defined day or time). At 406, the ducting determination component 116 can determine whether an electric tilt (e.g., of an antenna of the cellular node 202) is less than a minimum defined tilt of the antenna of the cellular node 202. If the electric tilt is determined (e.g., via the ducting determination component 116) to be less than the minimum tilt (e.g., YES at 406), then the process 400 can proceed to 408, at which the tilt of the antenna of the cellular node 202 is decreased by one unit value (or another defined amount), and then proceed to 414. If at 406, the electric tilt is determined (e.g., via the ducting determination component 116) not to be less than the minimum tilt (e.g., NO at 416), then the process can proceed to 410. At 410, the ducting determination component 116 can determine whether a transmit power (e.g., of an antenna of the cellular node 202) is less than a minimum defined transmit power of the antenna of the cellular node 202. If the transmit power is determined (e.g., via the ducting determination component 116) to be less than the minimum transmit power (e.g., YES at 410), then the process 400 can proceed to 412, at which the transmit power of the antenna of the cellular node 202 is decreased by one unit value (or another defined amount), and then proceed to 414. If at 410, the transmit power is determined (e.g., via the ducting determination component 116) not to be less than the minimum transmit power (e.g., NO at 410), then the process can proceed to 416, at which the new tilt and transmit power can be set (e.g., for the following day or another suitable date and time) (e.g., via the ducting mitigation component 118) and the process can end. At 414, the ducting determination component 116 can determine whether ducting is still predicted to occur. If ducting is still predicted to occur (e.g., YES at 414), then the process can return to 406. If at 414, ducting is not still predicted to occur (e.g., NO at 414), then the process can proceed to 416, at which the new tilt and transmit power can be set (e.g., for the following day or another suitable date and time) (e.g., via the ducting mitigation component 118) and the process can end.

Figure 5:
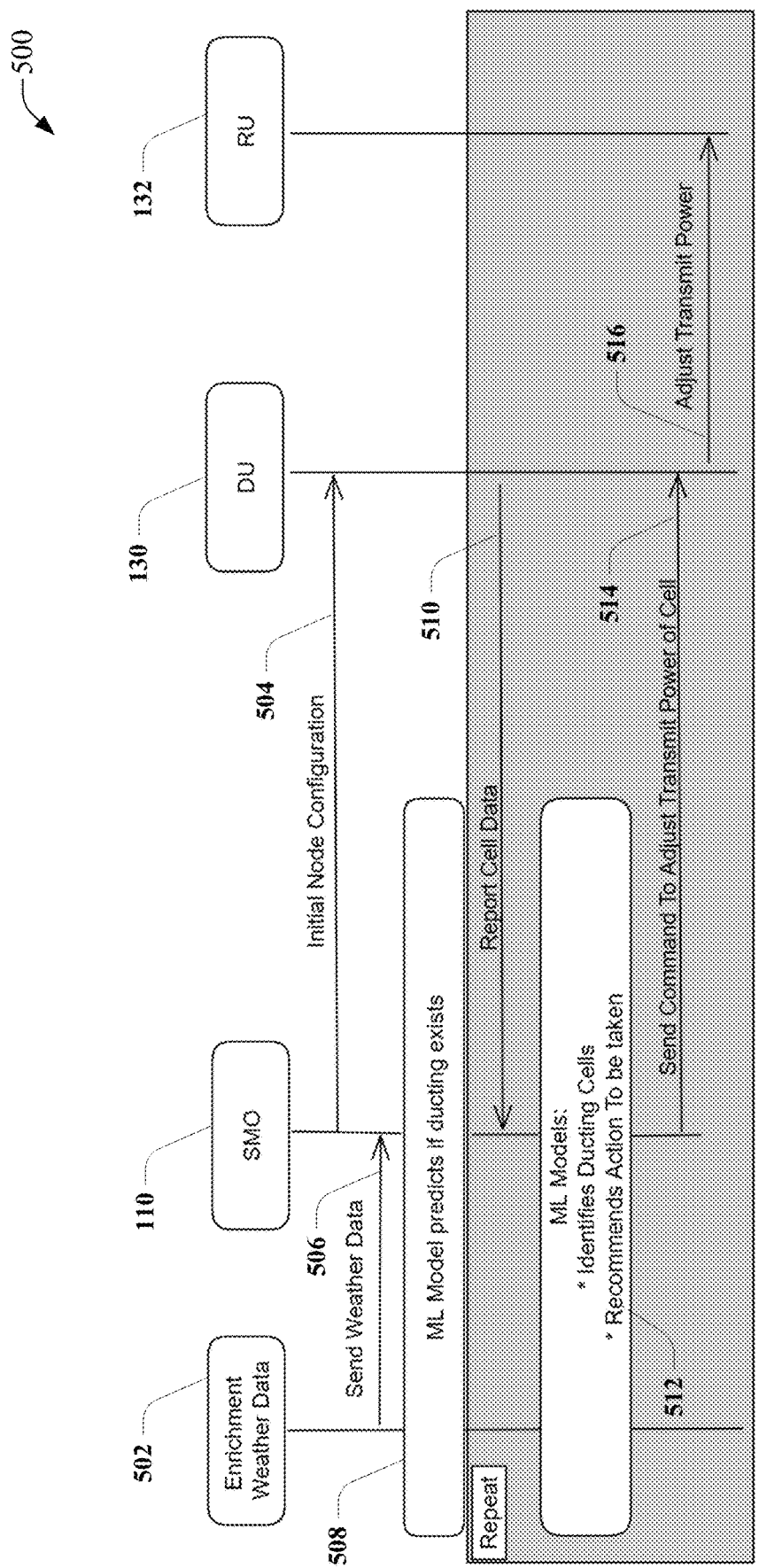
FIG. 5 is a flow chart for a process associated with ducting mitigation in accordance with one or more embodiments described herein.

FIG. 5 is a flow chart for a process 500 associated with ducting mitigation in accordance with one or more embodiments described herein. At 504, the SMO 110 can perform initial node configuration. At 506, the SMO 110 can retrieve enrichment weather data 502 (e.g., humidity, wind speed, wind direction, temperature, atmospheric pressure, terrain type, or other suitable enrichment weather data or meteorological data). At 508, the ducting determination component 116 can determine (e.g., via a ducting prediction model herein) whether ducting is predicted to exist. At 510, the DU 130 can report cell data to the SMO 110. At 512, one or more ML models (e.g., of the model(s) 122) can be utilized (e.g., via the SMO 110) in order to identify ducting cells and/or recommend actions to be taken. At 514, the SMO 110 can send an instruction to adjust a transmit power of the cellular node (e.g., to the DU 130). At 516, the DU 130 can send an instruction to the RU 132 to adjust the transmit power of the cellular node (e.g., cellular node 202). It is noted that steps 510-516 can repeat until the ducting is not predicted to occur and/or no further action is recommended to be taken, thus breaking the repeat loop.

Figure 6:
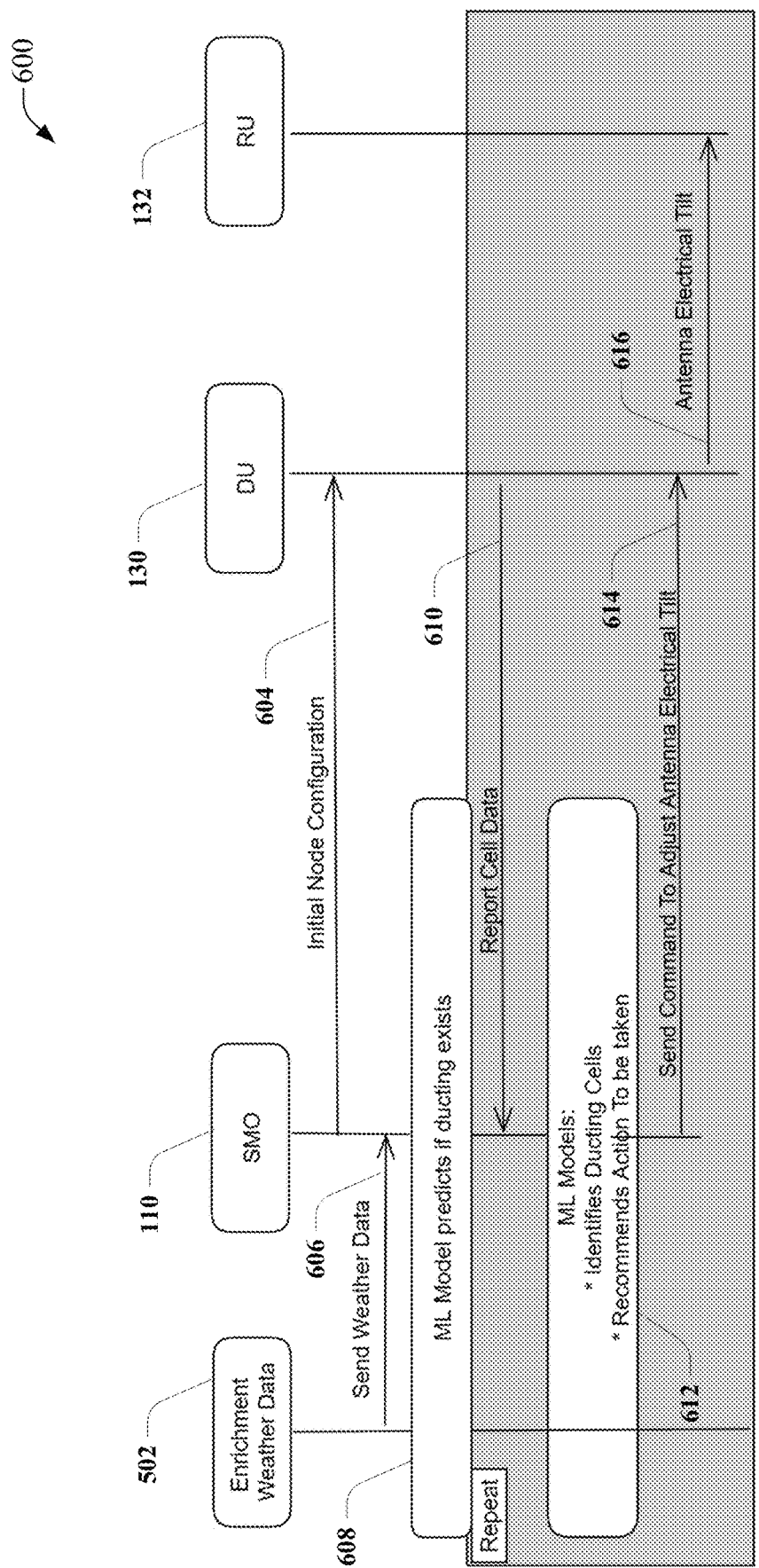
FIG. 6 is a flow chart for a process associated with ducting mitigation in accordance with one or more embodiments described herein.

FIG. 6 is a flow chart for a process 600 associated with ducting mitigation in accordance with one or more embodiments described herein. At 604, the SMO 110 can perform initial node configuration. At 606, the SMO 110 can retrieve enrichment weather data 502 (e.g., humidity, wind speed, wind direction, temperature, atmospheric pressure, terrain type, or other suitable enrichment weather data or meteorological data). At 608, the ducting determination component 116 can determine (e.g., via a ducting prediction model herein) whether ducting is predicted to exist. At 610, the DU 130 can report cell data to the SMO 110. At 612, one or more ML models (e.g., of the model(s) 122) can be utilized (e.g., via the SMO 110) in order to identify ducting cells and/or recommend actions to be taken. At 614, the SMO 110 can send an instruction to adjust antenna electrical tilt of the cellular node (e.g., to the DU 130). At 616, the DU 130 can send an instruction to the RU 132 adjust the antenna electrical tilt of the cellular node (e.g., cellular node 202). It is noted that steps 610-616 can repeat until the ducting is not predicted to occur and/or no further action is recommended to be taken, thus breaking the repeat loop.

Figure 7:
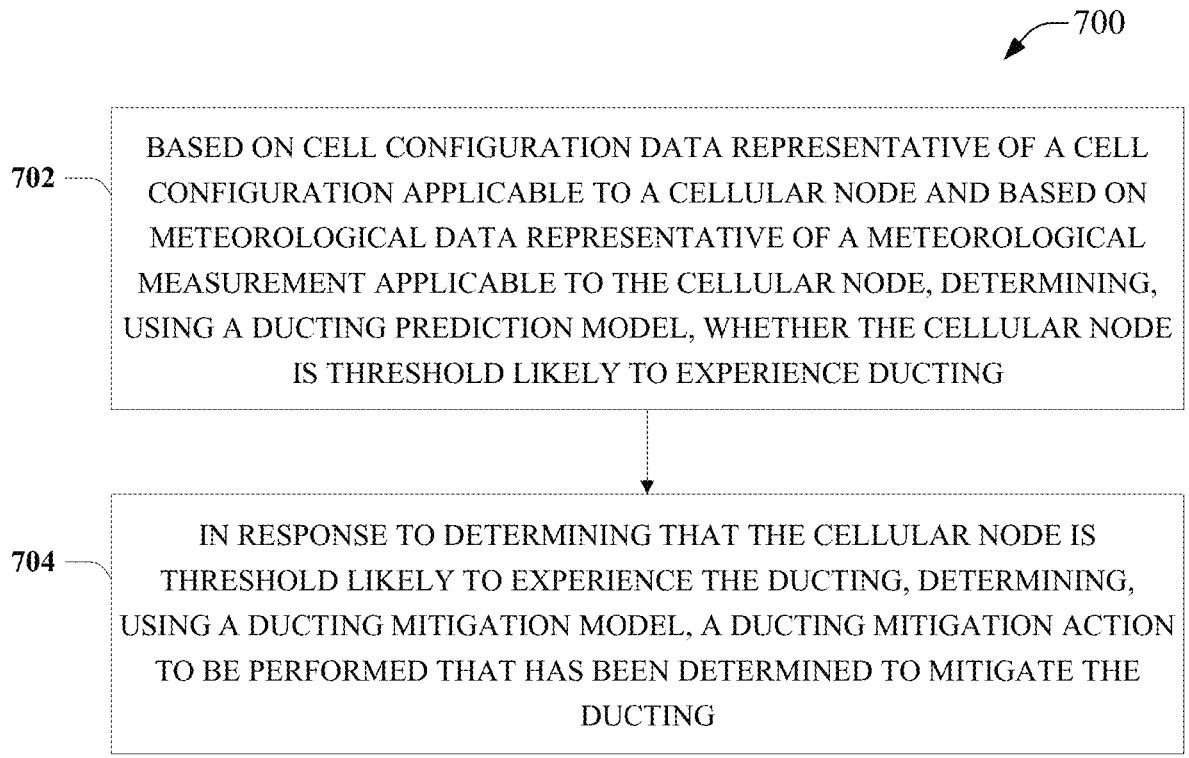
FIG. 7 is a block flow diagram for a process associated with ducting mitigation in accordance with one or more embodiments described herein.

FIG. 7 illustrates a block flow diagram for a process 700 associated with ducting mitigation in accordance with one or more embodiments described herein. At 702, the process 700 can comprise, based on cell configuration data representative of a cell configuration applicable to a cellular node (e.g., cellular node 202) and based on meteorological data representative of a meteorological measurement applicable to the cellular node, determining (e.g., via a ducting determination component 116), using a ducting prediction model (e.g., of the model(s) 122), whether the cellular node is threshold likely to experience ducting. At 704, the process 700 can comprise, in response to determining (e.g., via the ducting determination component 116) that the cellular node is threshold likely to experience the ducting, determining (e.g., via the ducting mitigation component 118), using a ducting mitigation model (e.g., of the model(s) 122), a ducting mitigation action to be performed that has been determined to mitigate the ducting.

Figure 8:
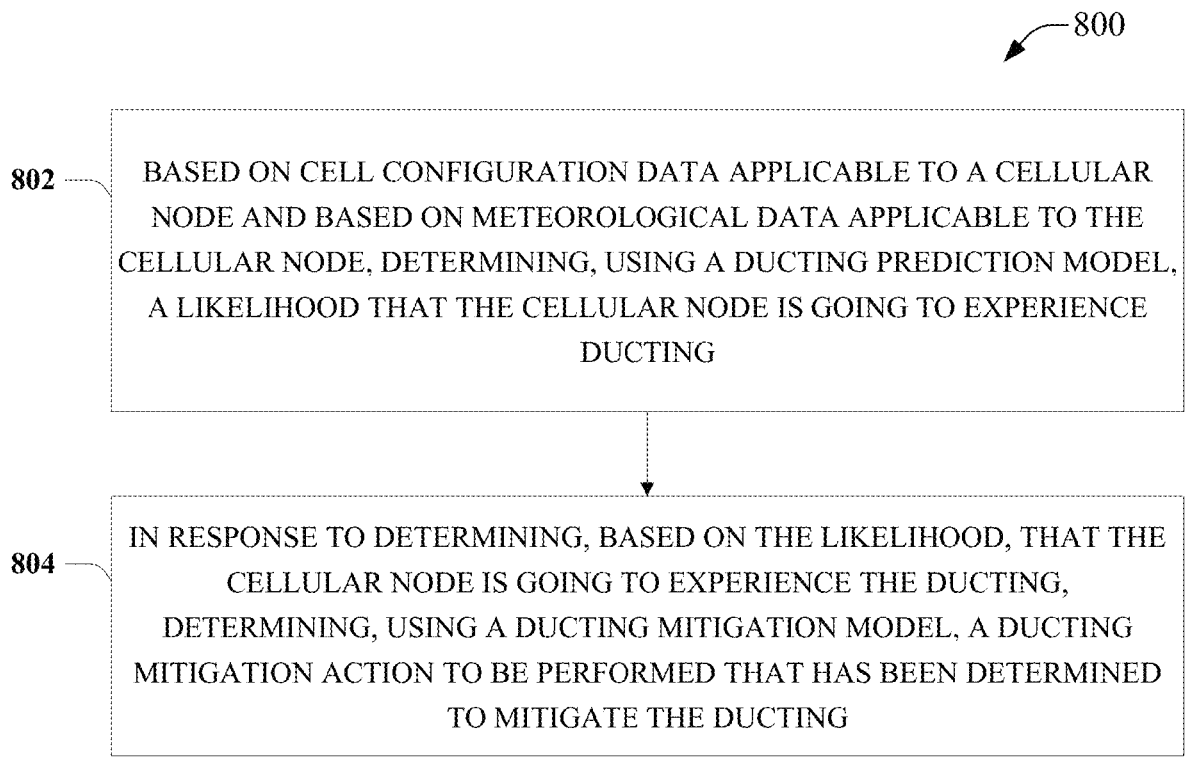
FIG. 8 is a block flow diagram for a process associated with ducting mitigation in accordance with one or more embodiments described herein.

FIG. 8 illustrates a block flow diagram for a process 800 associated with ducting mitigation in accordance with one or more embodiments described herein. At 802, the process 800 can comprise, based on cell configuration data applicable to a cellular node (e.g., cellular node 202) and based on meteorological data applicable to the cellular node, determining (e.g., via a ducting determination component 116), using a ducting prediction model (e.g., of the model(s) 122), a likelihood that the cellular node is going to experience ducting. At 804, the process 800 can comprise, in response to determining (e.g., via the ducting determination component 116), based on the likelihood, that the cellular node is going to experience the ducting, determining (e.g., via the ducting mitigation component 118), using a ducting mitigation model (e.g., of the model(s) 122), a ducting mitigation action to be performed that has been determined to mitigate the ducting.

Figure 9:
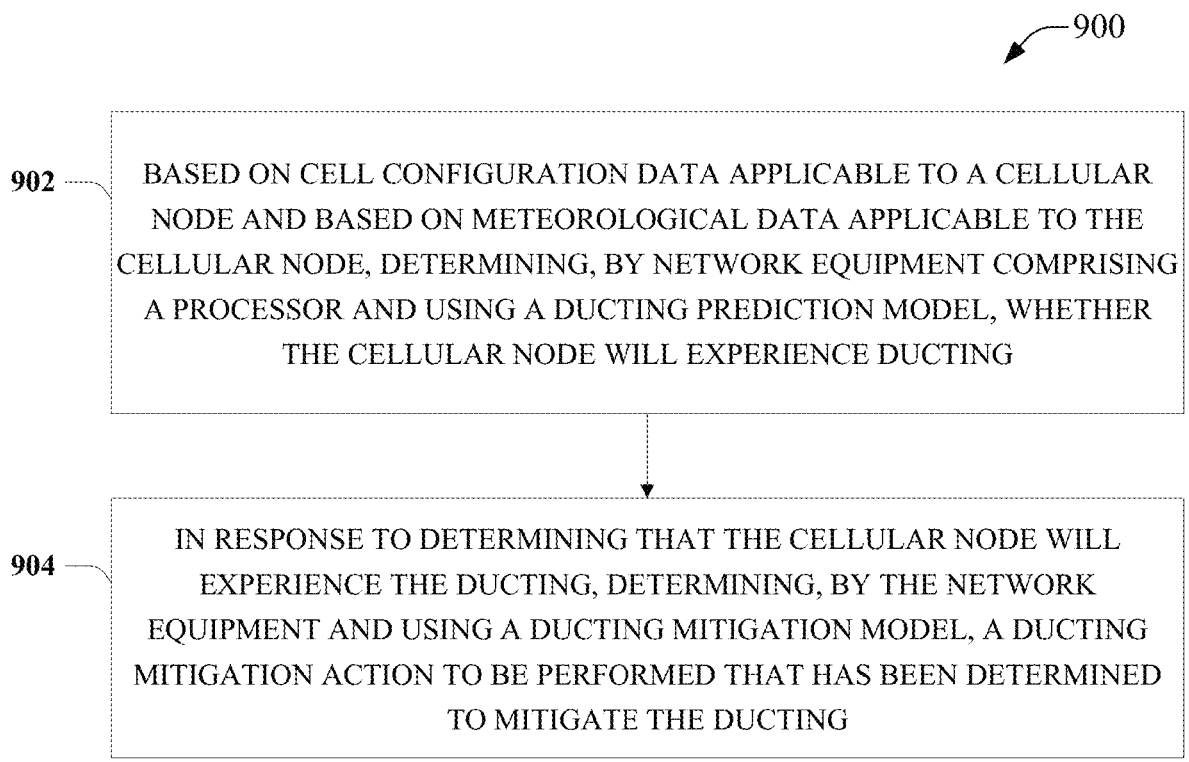
FIG. 9 is a block flow diagram for a process associated with ducting mitigation in accordance with one or more embodiments described herein.

FIG. 9 illustrates a block flow diagram for a process 900 associated with ducting mitigation in accordance with one or more embodiments described herein. At 902, the process 900 can comprise, based on cell configuration data applicable to a cellular node (e.g., cellular node 202) and based on meteorological data applicable to the cellular node, determining, by network equipment comprising a processor (e.g., via a ducting determination component 116) and using a ducting prediction model (e.g., of the model(s) 122), whether the cellular node will experience ducting. At 904, the process 900 can comprise, in response to determining (e.g., via the ducting determination component 116) that the cellular node will experience the ducting, determining, by the network equipment (e.g., via a ducting mitigation component 118) and using a ducting mitigation model (e.g., of the model(s) 122), a ducting mitigation action to be performed that has been determined to mitigate the ducting.

Figure 10:
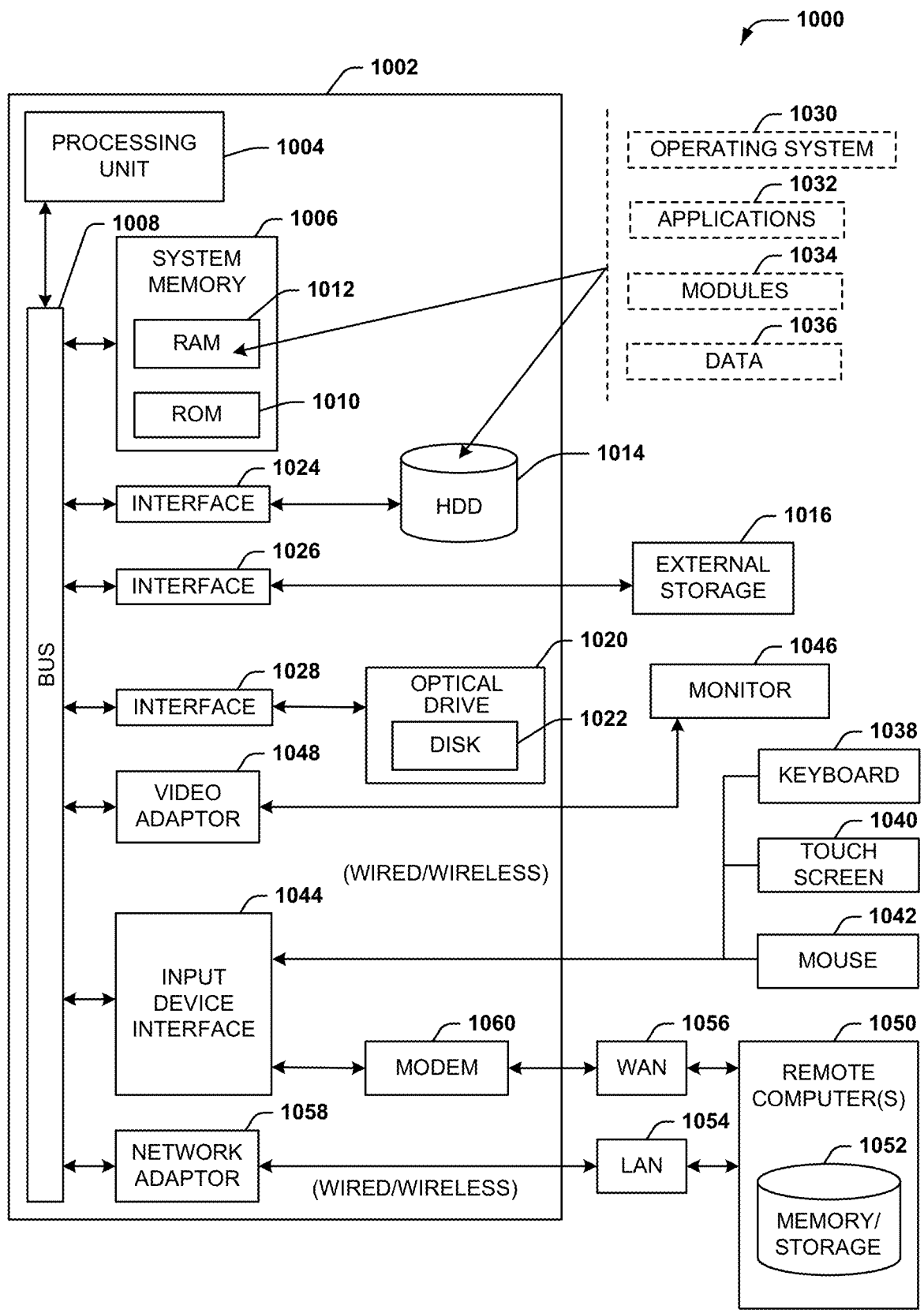
FIG. 10 is an example, non-limiting computing environment in which one or more embodiments described herein can be implemented.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive 1016, a memory stick or flash drive reader, a memory card reader, etc.) and an optical disk drive 1020 (e.g., which can read or write from a disk 1022 such as CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR)

remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Referring now to FIG. 11, there is illustrated a schematic block diagram of a computing environment 1100 in accordance with this specification. The system 1100 includes one or more client(s) 1102, (e.g., computers, smart phones, tablets, cameras, PDA's). The client(s) 1102 can be hardware and/or software (e.g., threads, processes, computing devices). The client(s) 1102 can house cookie(s) and/or associated contextual information by employing the specification, for example.

The system 1100 also includes one or more server(s) 1104. The server(s) 1104 can also be hardware or hardware in combination with software (e.g., threads, processes, computing devices). The servers 1104 can house threads to perform transformations of media items by employing aspects of this disclosure, for example. One possible communication between a client 1102 and a server 1104 can be in the form of a data packet adapted to be transmitted between two or more computer processes wherein data packets may include coded analyzed headspaces and/or input. The data packet can include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

In one exemplary embodiment, a client 1102 can transfer an encoded file, (e.g., encoded media item), to server 1104. Server 1104 can store the file, decode the file, or transmit the file to another client 1102. It is noted that a client 1102 can also transfer an uncompressed file to a server 1104 and server 1104 can compress the file and/or transform the file in accordance with this disclosure. Likewise, server 1104 can encode information and transmit the information via communication framework 1106 to one or more clients 1102.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word-without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   at least one processor; and
   at least one memory that stores executable instructions that, when executed by the at least one processor, facilitate performance of operations, comprising:
   based on cell configuration data representative of a cell configuration applicable to a cellular node and based on meteorological data representative of a meteorological measurement applicable to the cellular node, determining, using a ducting prediction model, whether the cellular node is threshold likely to experience ducting;
   in response to determining that the cellular node is threshold likely to experience the ducting, determining, using a ducting mitigation model, a ducting mitigation action to be performed that has been determined to mitigate the ducting;
   initiating the ducting mitigation action that has been determined to mitigate the ducting; and
   in response to initiating the ducting mitigation action, determining, using the ducting prediction model, whether the ducting applicable to the cellular node has stopped occurring.

2. The system of claim 1, wherein the ducting prediction model was generated using machine learning based on past ducting, other than the ducting.

3. The system of claim 1, wherein the ducting mitigation model was generated using machine learning based on past ducting mitigation actions, other than the ducting mitigation action.

4. The system of claim 1, wherein the ducting mitigation action comprises a change in transmission power applicable to the cellular node.

5. The system of claim 1, wherein the ducting mitigation action comprises a change in a tilt of an antenna applicable to the cellular node.

6. The system of claim 1, wherein the cell configuration data comprises at least one of time advance data representative of a time advance applicable to the cellular node, geographical location data representative of a geographical location of the cellular node, azimuth data representative of an azimuth associated with the cellular node, antenna height data representative of a height of an antenna of the cellular node, transmission power data representative of a power with which the cellular node transmits, operating frequency data representative of an operating frequency associated with the cellular node, duplexing technique data representative of a duplexing technique usable by the cellular node, antenna tilt data representative of a tilt of the antenna of the cellular node, or antenna gain data representative of a gain of the antenna of the cellular node.

7. The system of claim 1, wherein the meteorological data comprises at least one of humidity data representative of a humidity measurement applicable to the cellular node, wind speed data representative of a wind speed measurement applicable to the cellular node, wind direction data representative of a wind direction measurement applicable to the cellular node, temperature data representative of a temperature measurement applicable to the cellular node, atmospheric pressure data representative of an atmospheric pressure measurement applicable to the cellular node, or terrain type data representative of a terrain type applicable to the cellular node.

8. The system of claim 1, wherein the operations further comprise:
   in response to a result of the determining whether the ducting has stopped occurring indicating that the ducting has not stopped occurring, determining, using the ducting mitigation model, a revised ducting mitigation action different from the ducting mitigation action.

9. The system of claim 8, wherein the operations further comprise:
initiating the revised ducting mitigation action.

10. A non-transitory machine-readable medium, comprising executable instructions that, when executed by at least one processor, facilitate performance of operations, comprising:
based on cell configuration data applicable to a cellular node and based on meteorological data applicable to the cellular node, determining, using a ducting prediction model, a likelihood that the cellular node is going to experience ducting;
in response to determining, based on the likelihood, that the cellular node is going to experience the ducting, determining, using a ducting mitigation model, a ducting mitigation action to be performed that has been determined to mitigate the ducting;
initiating the ducting mitigation action that has been determined to mitigate the ducting; and
after initiating the ducting mitigation action, determining, using the ducting prediction model, whether the ducting applicable to the cellular node has stopped occurring.

11. The non-transitory machine-readable medium of claim 10, wherein the ducting prediction model was generated using machine learning based on past ducting, other than the ducting.

12. The non-transitory machine-readable medium of claim 10, wherein the ducting mitigation model was generated using machine learning based on past ducting mitigation actions, other than the ducting mitigation action.

13. The non-transitory machine-readable medium of claim 10, wherein the ducting mitigation action comprises a change in transmission power applicable to the cellular node.

14. The non-transitory machine-readable medium of claim 10, wherein the ducting mitigation action comprises a change in a tilt of an antenna applicable to the cellular node.

15. A method, comprising:
based on cell configuration data applicable to a cellular node and based on meteorological data applicable to the cellular node, determining, by network equipment comprising at least one processor and using a ducting prediction model, whether the cellular node will experience ducting;
in response to determining that the cellular node will experience the ducting, determining, by the network equipment and using a ducting mitigation model, a ducting mitigation action to be performed that has been determined to mitigate the ducting;
initiating, by the network equipment, the ducting mitigation action that has been determined to mitigate the ducting; and
based on the initiating of the ducting mitigation action, determining, by the network equipment using the ducting prediction model, whether the ducting applicable to the cellular node has stopped occurring.

16. The method of claim 15, wherein the cell configuration data comprise at least one of time advance data, geographical location data, azimuth data, antenna height data, transmission power data, operating frequency data, duplexing technique data, antenna tilt data, or antenna gain data applicable to the cellular node.

17. The method of claim 15, wherein the meteorological data comprise at least one of humidity data, wind speed data, wind direction data, temperature data, atmospheric pressure data, or terrain type data applicable to the cellular node.

18. The method of claim 15, further comprising:
facilitating, by the network equipment, the ducting mitigation action that has been determined to mitigate the ducting.

19. The method of claim 15, further comprising:
in response to a result of the determining whether the ducting has stopped occurring indicating that the ducting has not stopped occurring, determining, by the network equipment using the ducting mitigation model, a revised ducting mitigation action different from the ducting mitigation action.

20. The method of claim 19, further comprising:
initiating, by the network equipment, the revised ducting mitigation action.

* * * * *